(12) United States Patent
Dahlen et al.

(10) Patent No.: US 8,850,249 B2
(45) Date of Patent: *Sep. 30, 2014

(54) ENABLING IDLE STATES FOR A COMPONENT ASSOCIATED WITH AN INTERCONNECT

(75) Inventors: Eric Dahlen, Sherwood, OR (US); Jimbo Alexander, Aloha, OR (US); Parthipan Satchi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1192 days.

This patent is subject to a terminal disclaimer.

(21) Appl. No.: 12/767,013

(22) Filed: Apr. 26, 2010

(65) Prior Publication Data

US 2010/0205503 A1      Aug. 12, 2010

Related U.S. Application Data

(63) Continuation of application No. 11/646,932, filed on Dec. 28, 2006, now Pat. No. 7,734,942.

(51) Int. Cl.
*G06F 1/32*          (2006.01)
(52) U.S. Cl.
CPC ..................... *G06F 1/3203* (2013.01)
USPC ............. 713/323; 713/322; 713/324; 714/25
(58) Field of Classification Search
USPC .................... 713/322–324; 714/25
See application file for complete search history.

(56) References Cited

U.S. PATENT DOCUMENTS

| | | | | |
|---|---|---|---|---|
| 5,692,197 | A * | 11/1997 | Narad et al. | 713/323 |
| 6,009,488 | A | 12/1999 | Kavipurapu | |
| 6,199,134 | B1 * | 3/2001 | Deschepper et al. | 710/311 |
| 6,836,849 | B2 * | 12/2004 | Brock et al. | 713/310 |
| 6,922,548 | B1 * | 7/2005 | Moore et al. | 455/41.2 |
| 7,076,718 | B2 * | 7/2006 | Miyoshi | 714/748 |
| 7,236,740 | B2 * | 6/2007 | Koo et al. | 455/13.4 |
| 2005/0149768 | A1 | 7/2005 | Kwa et al. | |
| 2005/0204250 | A1 * | 9/2005 | Hong et al. | 714/748 |
| 2007/0074140 | A1 * | 3/2007 | Yancey et al. | 716/16 |

OTHER PUBLICATIONS

Intel® Technology Journal- vol. 9, Issue 01, "The Emergence of PCI Express in the Next Generation of Mobile Platforms," Feb. 17, 2005, pp. 21-34.
U.S. Appl. No. 11/166,646, filed Jun. 23, 2005, entitled "A Method and System for Deterministic Throttling for Thermal Management" by Seh W. Kwa, Animesh Mishra, and Naveen Cherukuri.

(Continued)

*Primary Examiner* — Thuan Du
(74) *Attorney, Agent, or Firm* — Trop, Pruner & Hu, P.C.

(57) ABSTRACT

In one embodiment, the present invention includes a method for receiving an information packet in a first port from an interconnect while an agent associated with the first port is in an idle low power state, transmitting a first signal from the first port along the interconnect to request re-transmission of the information packet, and sending a second signal from the first port to the agent to cause the agent to enter a fully active power state. Other embodiments are described and claimed.

20 Claims, 4 Drawing Sheets

(56) References Cited

OTHER PUBLICATIONS

U.S. Appl. No. 11/173,784, filed Jun. 30, 2005, entitled "Various Methods and Apparatuses for Power States in a Controller" by Jim Kardach, Barnes Cooper, Seh Kwa, Animesh Mishra, and Paul Diefenbaugh.

U.S. Appl. No. 11/173,220, filed Jun. 30, 2005, entitled "Power Management System for Computing Platform" by Jim Kardach, Barnes Cooper, Paul Deifenbaugh, Seh Kwa, Animesh Mishra.

U.S. Appl. No. 11/384,681, filed Mar. 20, 2006, entitled "Providing a Deterministic Window for an Idle State," by Seh W. Kwa and David J. Harriman.

* cited by examiner

ENABLING IDLE STATES FOR A COMPONENT ASSOCIATED WITH AN INTERCONNECT

This application is a continuation of U.S. patent application Ser. No. 11/646,932, filed Dec. 28, 2006 now U.S. Pat. No. 7,734,942 entitled "Enabling Idle States For A Component Associated With An Interconnect," the content of which is hereby incorporated by reference.

BACKGROUND

Embodiments of the present invention relate to power management for a system including devices coupled via an interconnect.

High performance serial-based interconnect or link technologies such as Peripheral Component Interconnect (PCI) Express™ (PCIe™) links based on the PCI Express™ Specification Base Specification version 1.1 (published Mar. 28, 2005) (hereafter the PCIe™ Specification) are being adopted in greater numbers of systems. PCIe™ links are point-to-point serial interconnects with N differential pairs intended for data transmission with either sideband clock forwarding or an embedded clock provided in each direction. Clock synchronization and data recovery requirements significantly influence the exit latencies of low power state exit and thus impact the effective use of low power states if the serial link always has to be armed for asynchronous bus master traffic. For example, a phase-locked loop (PLL) and a platform reference clock remain energized in the ready state even in the absence of traffic activities. This has a direct and negative consequence on the average power consumption of both devices coupled to the link.

In the PCIe™ Specification, various power saving states are provided for a link (i.e., an interface) of a serial interconnect. Specifically, the specification describes the presence of link states L0, $L0_s$, L1, L2 and L3. The L0 state corresponds to link on and the L2 and L3 states correspond to link off (with the difference being that auxiliary power is present in the L2 state), while the $L0_s$ state provides for a low-resume standby latency state, and the L1 state corresponds to a low power standby state. These low power states may be achieved via the Active Status Power Management (ASPM) capability of a PCIe™ interface, which enables an endpoint device to request entry into a low power state. Typically, however, an upstream device such as a core (and its related clocks) remains energized, dissipating significant power.

In many different system types such as server and workstation platforms, idle power dissipation can be a large concern. This is especially so in such platforms including multiple processors, such as a multiprocessor (MP) system, or even a single processor platform including multiple cores. Given the vast computing resources of such processors, oftentimes one or more cores (or even entire processor sockets) may not be performing useful work. However, it remains difficult to place such components into a low power state as it is unknown when new information will need to be processed by the components. While software-managed system power states are increasingly supported, these states can have significant exit latencies which discourage their usage for brief periods of low demand (such as may be measured in fractions to handfuls of seconds, rather than in minutes or hours). Hardware-autonomous mechanisms for power reduction, such as ASPM may be present, however these mechanisms require support on both ends of an interface, and this support can be inconsistent.

Further, serial interfaces implementing autonomous standby and sleep states also commonly include autonomous wake-up without prior software notification. The need to support such traffic without breaking an interface's protocol has historically precluded low power states such as deep-sleep entry by various platform components, including a processor core, irrespective of the duration of inactivity enabling the interface standby states.

DETAILED DESCRIPTION

Figure 1:
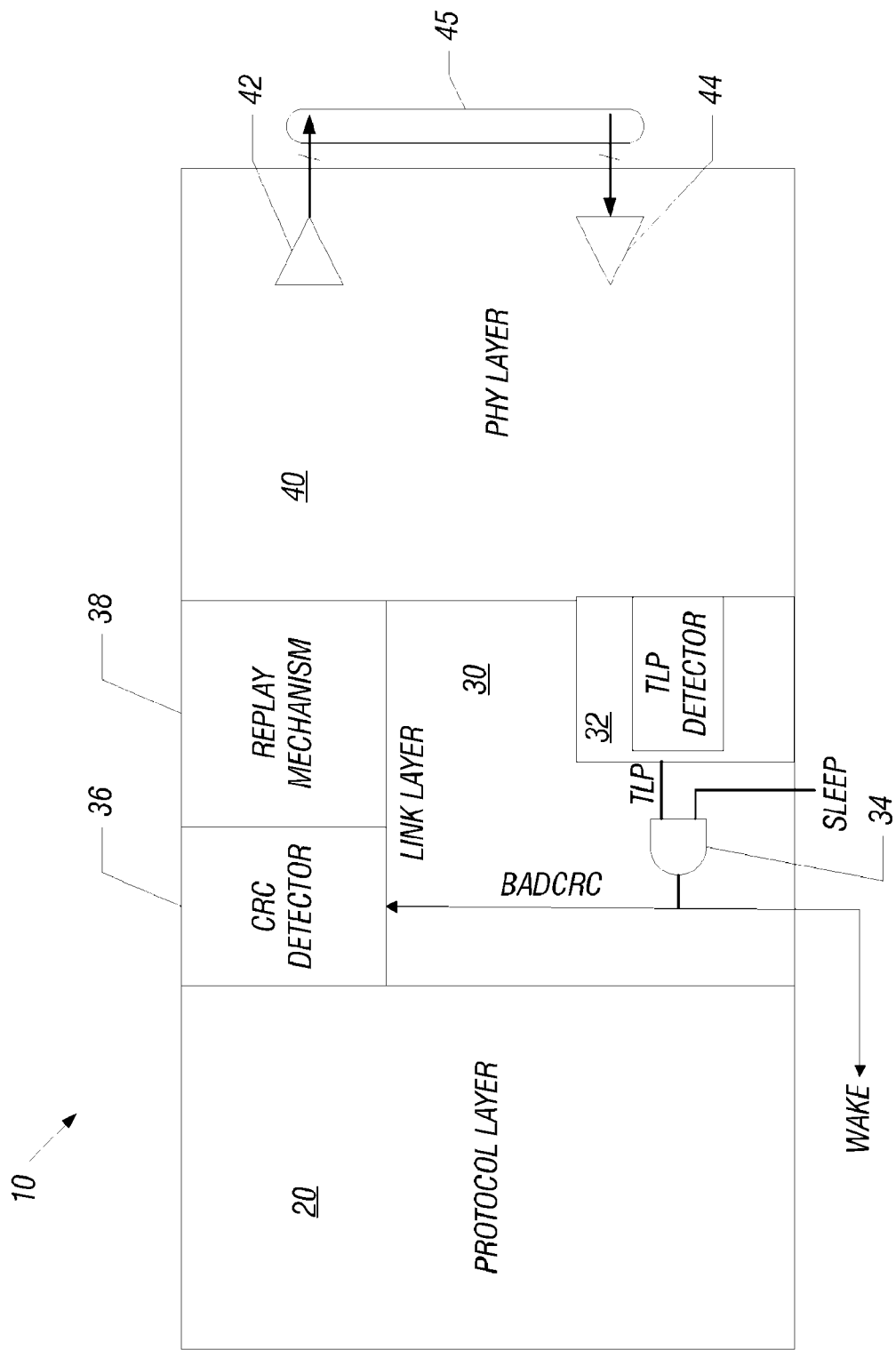
FIG. 1 is a block diagram of a port in accordance with one embodiment of the present invention.

Embodiments may support idle power states of a system component such as a processor core, e.g., a deep sleep state, despite the potential for traffic initiation on an interface connecting system components at any time without prior notification. Embodiments may take advantage of the fact that high-speed serial interfaces include built-in error handling to recover from signaling errors (e.g., bit errors) to ensure reliable operation. One example of such handling is a link-level retry mechanism. For example, some protocols include measures to detect and recover from bit errors via re-transmission of compromised data. An example implementation is a PCIe™ interconnect, where transmissions across the interface are protected by a cyclic redundancy checksum (CRC) code, and compromised packets on the interface are actively non-acknowledged (NAK) by a receiving device upon detection of an erroneous CRC. In turn, this NAK message is sent from the receiving device to the initiating device. The NAK message initiates retransmission by the initiator. Note that some incidence of such retries are an expected behavior of a normally operating system.

Embodiments may be used to force a "bad" transmission detection mechanism to become active in the presence of a given power down state in an associated system agent coupled to the receiving interface, for example, a deep sleep state in a core of the platform. The deep sleep state of the core may correspond to a clock-stopped condition. Given that a clock distribution system may approach one third of the power dissipation in some components, stopping clocks may lead to significant power reduction in the absence of traffic in a platform.

In one embodiment, when an associated system agent enters a low power state such as via a mechanism to stop a core clock, a signal is sent to an interface controller to force activation of a bit error detection and recovery mechanism, e.g., a "bad" CRC on receipt of a packet such as a transaction layer packet (TLP). In a PCIe™ embodiment, a CRC32 check mechanism for TLP traffic is forced to generate a "bad" status, thereby initiating a NAK. Reception of a TLP and generation of a responsive NAK message may trigger resumption of core clocking. Such an embodiment ensures that no traffic handling or interface protocol violation results from shutting down the core clock, because the interface provides for a full retransmission of the traffic which initiated the "wake up" from the clock-stopped state of the associated core.

While embodiments may be implemented with various software-based power management support, some implementations may be associated with the Advanced Configuration and Power Interface (ACPI) in accordance with ACPI version 2.0 (published July 2000), or without any such association to power management software. ACPI implements two main types of states called "global" and "device" states. The global states affect overall power consumption and response of a platform, while device states relate to individual devices such as disk drives, displays, and so forth.

Briefly, the global states of ACPI divide power usage and system response into four levels, designated G0 through G3, where level G1 is further subdivided into sleep states, with its own hierarchy of response and power savings. The global states include a G0 state which is the working state in which a platform operates normally. Even in G0 state, however, some devices that are inactive may automatically power down, but they will quickly resume normal operation when called upon. G1 corresponds to a sleep state during which no computation visibly appears to be occurring. When in the G1 state, various system events can cause a platform to return to the G0 state. Within the G1 state are several special sleeping states that trade off greater exit latencies for greater reductions in power consumption. G2 state is a soft-off state, exit from which incurs a system reboot, however, some power may continue to enable monitoring of external events that may trigger a wakeup of the platform.

Within the G1 state, ACPI defines five levels of sleep. The defining differences concern exit latencies required for the system to wake up and return to G0 state from sleep. Such sleep states may include the following: the S1 sleep state is a standby state in which registers and cache contents in the processor are preserved so the platform can return to the G0 state with minimal exit latency. For example, disk drives and display may be powered off, but the processor, memory, and fans remain active. The S2 sleep state is also a standby state with a slightly longer exit latency, as the contents of caches or the processor's registers are not preserved. The S3 sleep state has a still greater exit latency, as processor components are placed in standby, and only system memory remains powered. The processor resets itself when it wakes up and restores all other system parameters from storage. In the S4 sleep state, even the contents of memory are lost. Thus, before the system can return to normal operation, the processor recovers its settings, data, and so forth. The S5 sleep state may correspond to the G2 soft off state, in which the platform reboots to move from S5 back to the G0 state.

Embodiments may be implemented in many different system types and may be embodied within various interfaces. In some implementations, ports of system components coupled via serial interconnects may implement embodiments of the present invention. Referring now to FIG. 1, shown is a block diagram of a port in accordance with one embodiment of the present invention. As shown in FIG. 1, port 10, which may be a port of an interface such as might be found on an input/output hub (IOH), a memory controller hub (MCH) or another system agent such as a processor, graphics unit, memory or so forth, includes various components. Specifically, as shown in FIG. 1, port 10 includes multiple layers to handle a given communication protocol. In the embodiment of FIG. 1, port 10 includes a protocol or transaction layer 20 (hereinafter protocol layer), a link layer 30, and a physical (PHY) layer 40.

Each layer may be configured to perform certain activities with regard to a communication protocol. For example, in one implementation protocol layer 20 may determine how agents communicate. Thus the protocol layer sets the format for a transaction layer packet, or TLP, which may correspond to an individual transaction communicated between nodes through a representative port interface. Such a TLP typically contains information to identify the packet and its purpose (e.g., whether it is communicating data in response to a request or requesting data from another node). While not shown in FIG. 1, understand that protocol layer 20 may in turn be coupled to a system agent such as a processor or other component. In embodiments in which port 10 is present in a chipset such as a MCH or IOH, protocol layer 20 may be coupled to an independent device or even to a processor socket via a serial interconnect. In other implementations, port 10 may be configured within a processor socket and accordingly, protocol layer 20 may be coupled to one or more processor cores via either intra-chip or inter-chip interconnects which also may be serial-based interconnects. Link layer 30 may handle flow control, which may include error checking and encoding mechanisms. Through link layer 30, port 10 keeps track of packets sent and received and sends and receives acknowledgements in regard to such packets. PHY layer 40 may act as the physical interface between port 10 and another component to which it may be coupled, e.g., via a serial-based interconnect.

Referring still to FIG. 1, PHY layer 40 may handle physical communication, i.e., electrical communication of information and signaling along an interconnect. Accordingly, PHY layer 40 may include one or more drivers 42, each of which may be associated with a given lane, e.g., a bit lane coupled to an interconnect 45 that may include multiple serial links in both transmit and receive directions. Furthermore, PHY layer 40 may include one or more receivers 44, each of which may be coupled to an incoming receive lane of interconnect 45.

Depending on the volume of traffic on the interconnect coupled to port 10, the quantity of lanes that are active in PHY layer 40 may be reduced. To further conserve power when no traffic is present on the interconnect, port 10 itself may enter a low power state in which, at least, protocol layer 20 may be powered down. Additional power conservation measures may be implemented in other portions of port 10. Furthermore, because protocol layer 20 can be powered down in such instances, a device to which protocol layer 20 is coupled, e.g., a processor core or other system agent may also enter a low power or sleep state. Note that such a low power state may be entered although system-level power management mechanisms including hardware and software-based mechanisms may not be activated. While the scope of the present invention is not limited in this regard, in many embodiments in which port 10 is coupled to a processor core, the associated core may enter a sleep state in which significant power saving measures can be implemented such as powering down of processor clocks and so forth.

As shown in the embodiment of FIG. 1, link layer 30 may be configured to cause the waking up of a core or other system agent that may be in a sleep state when an incoming packet is received in link layer 30. While the scope of the present invention is not limited in this regard, the sleep state may take many different forms. For example, in some implementations the sleep state may be an autonomous hardware sleep state. That is, in the absence of software support (e.g., ACPI activation) or sufficiently widespread idle conditions which would otherwise enable a full system state transition, a system component may still enter a sleep state to reduce power consumption. Thus embodiments may leverage the rapid exit latencies made possible by embodiments of the present invention by providing additional power saving mechanisms, such as shutting down of clock generation blocks and so forth that can consume significant power.

Still referring to FIG. 1, link layer 30 includes a TLP detector 32 that may detect the presence of an incoming packet received by PHY layer 40. When such an incoming packet is detected, TLP detector 32 may generate a signal (e.g., a logic high signal), namely a TLP signal that may be provided to a logic gate 34 which in the embodiment of FIG. 1 may be an AND gate. AND gate 34 is further coupled to receive a SLEEP signal, which may be received from a given system agent, e.g., processor core or other such agent when that component has entered a sleep state. In the embodiment of FIG. 1, the SLEEP signal may be at a logic high level when the corresponding component is in the sleep state. Accordingly, AND gate 34 may generate a logic high output, namely a BADCRC signal, upon receipt of an incoming TLP while the corresponding device is in the sleep state. This signal from AND gate 34 may be provided to multiple locations. Specifically, as shown in FIG. 1, the output of logic gate 34 may act as a wake up signal (i.e., the WAKE signal) that is sent to the corresponding agent to cause it to exit the sleep state. Similarly, the signal from AND gate 34 is provided to a CRC detector 36 of link layer 30 to force detection of a signaling error in the received TLP which activated the WAKE signal. Note that this indication to CRC detector 36 does not necessarily mean that the actual received packet in fact includes one or more bit errors. Instead, this indication may cause a replay mechanism 38 of link layer 30 to indicate the presence of the signaling error that in turn may cause PHY layer 40 to transmit an indication, e.g., a NAK, back to the sender of the packet, e.g., via driver 42 and interconnect 45 that in turn may cause the sender to re-send the packet.

In other words, port 10 may masquerade or pretend that the received packet had a signaling error, e.g., via a BADCRC signal, and thus request a replay of the packet, e.g., via a no acknowledgement (NAK) message back to the sender. At the same time that this replay is requested and performed, port 10, by providing the WAKE signal, causes the corresponding core or other agent to exit the sleep state so that when the re-transmitted packet is received by port 10, the component is ready to service the packet.

While the description of this particular implementation in the embodiment of FIG. 1 is quite specific, the scope of the present invention is not limited in this regard. That is, in other implementations a port may have a different form than that shown in FIG. 1. Furthermore, incoming packets may be detected in other ways and the logic shown in link layer 30 may be handled in hardware, software, firmware or combinations thereof in other implementations. Still further, instead of the CRC detector and replay mechanism shown, other embodiments may transmit a different message to a sender to request retransmission of a packet sent while an associated system agent is in a sleep state. For example, instead of a NAK message, other embodiments may perform retraining of the interconnect to cause an initiator device to re-transmit a given packet while in the interim, an associated core or other system agent may re-enter a full power state to be able to handle the re-transmitted packet when it is received. Furthermore, while described herein primarily with regard to a PCIe™ interconnect, embodiments may be configured for use with various interconnects, and particularly high-speed serial-based interconnects that have robust communication protocols in which received packets are expressly acknowledged.

In some embodiments, a measure of hysteresis can be included to ensure that a given power down state, e.g., a deep-sleep state, is only entered when the system is truly idle. Furthermore, any traffic initiating wake-up may be completely dispositioned prior to allowing the core to re-enter into the power down state. In some implementations, dynamically adaptive hysteresis may be used to amortize exit latencies over many entry-exit cycles to target desired latency/power trade-offs.

Figure 2:
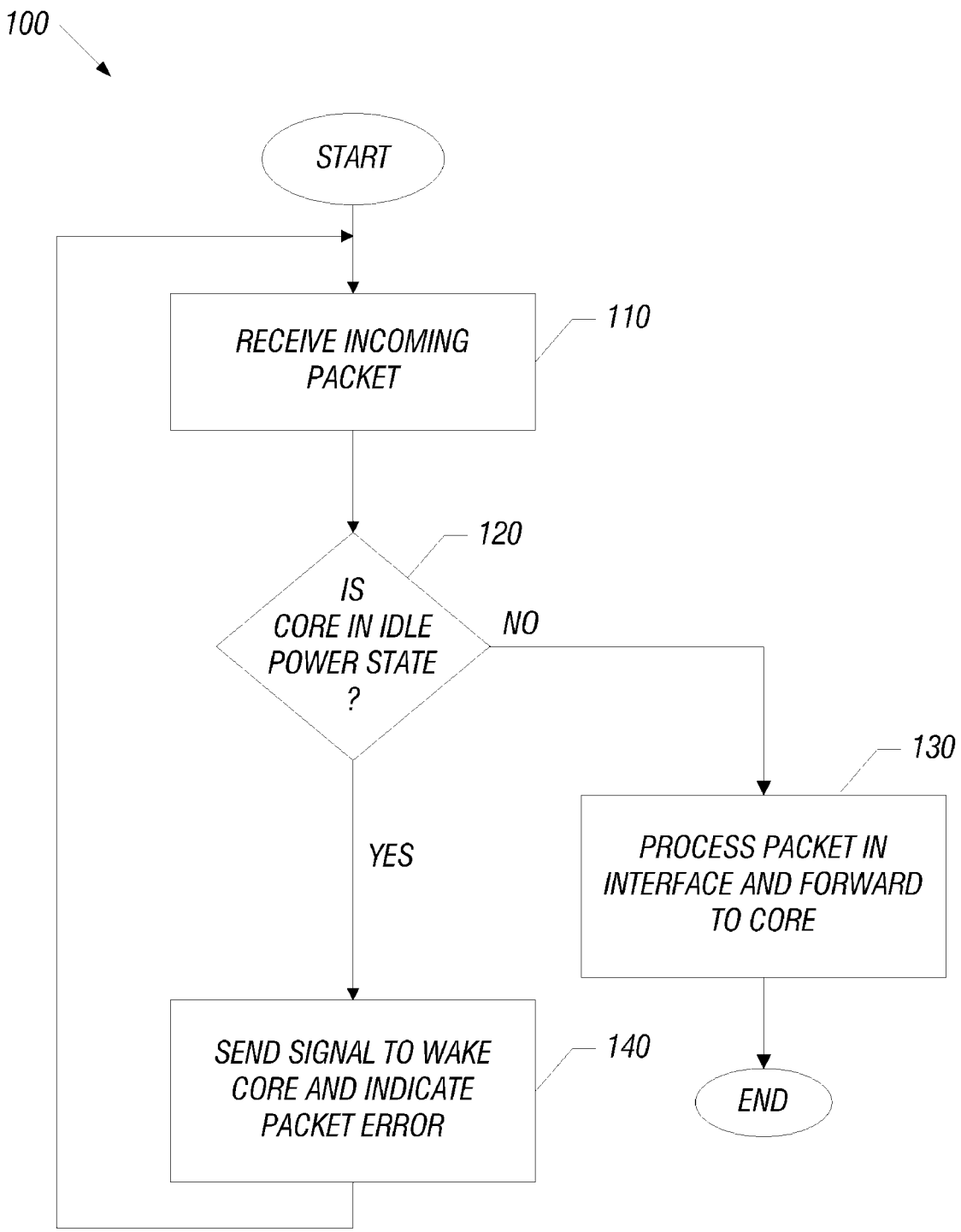
FIG. 2 is a flow diagram of a method in accordance with one embodiment of the present invention.

Referring now to FIG. 2, shown is a flow diagram of a method in accordance with one embodiment of the present invention. Specifically, FIG. 2 shows a method 100 for handling incoming packets while an associated core may be in a low power state. In one implementation, method 100 may be performed using hardware, software, and/or firmware of an interface coupled to the core. As one example, the interface may be a hub such as an MCH or IOH to which a processor is coupled via a serial interconnect such as a PCIe™ interconnect. As shown in FIG. 2, method 100 may begin by receiving an incoming packet (block 110). For example, an incoming TLP may be received by a port from another device via an interconnect. The port may then determine whether an associated core is in a reduced-power idle state (diamond 120). For example, a port may receive a sleep indicator or other such signal indicating that the associated core is in such a state. In this state, the processor clock may be shut down, and/or other components of the core may be in a low power state. If it is determined that the core is not in a low power state, control passes to block 130. At block 130, the incoming packet may be processed in the interface and forwarded to the core for further processing. For example, various layers of the port may perform link, protocol and other layer processing before the packet is forwarded to the core.

If instead at diamond 120 it is determined that the core is in a sleep state, control passes to block 140. At block 140, the port may take various actions, including sending a signal that may be used to cause the core to re-awaken and enter normal operation. Furthermore, the signal may be used to indicate a packet error. For example, link layer processing may be performed to generate a checksum error regardless of whether the received packet actually includes such an error. This checksum error may thus cause a message to be sent across the interconnect from the port to the initiator to request re-transmission of the packet.

Accordingly, as shown in FIG. 2, control may pass back to block 110, where another packet may be received. This packet may correspond to a replayed version of the original incoming packet. However, this time when the packet is received, it may be determined that the core is in its normal operating state. Thus control ultimately may pass to block 130, discussed above. While specifically described with this particular implementation in the embodiment of FIG. 2, understand the scope of present invention is not limited in this regard. As described above, ports or other interfaces that implement embodiments of the present invention may be realized in many different configurations. For example, such interfaces may be present in chipset components such as MCHs or IOHs. Alternately, such interfaces may be associated with peripheral devices such as a graphics card or other peripheral component. Still further, embodiments may be implemented directly in a processor socket.

Figure 3:
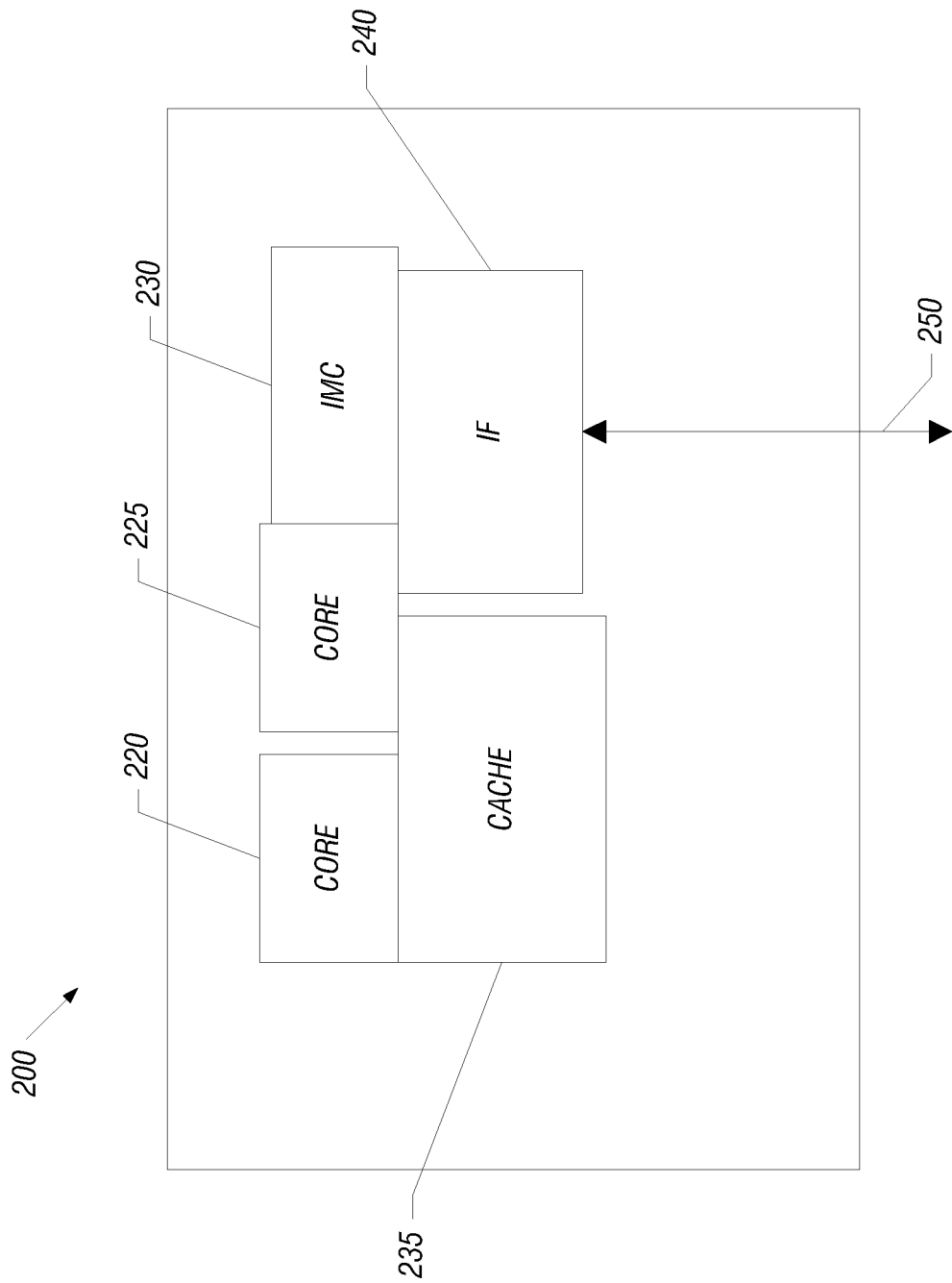
FIG. 3 is a block diagram of a processor module in accordance with one embodiment of the present invention.

Referring now to FIG. 3, shown is a block diagram of a processor module in accordance with one embodiment of the present invention. As shown in FIG. 3, processor module 200 may be a single socket processor and may correspond to a uniprocessor, mobile processor or the like. Processor module 200 may include multiple cores, including a first core 220 and a second core 225. Furthermore, processor module 200 may include an integrated memory controller (IMC) 230. Processor module 200 may further include a cache memory 235 such as a static random access memory (SRAM). Such a processor module may be implemented in many different system types such as dual processor (DP) systems, multiprocessor systems, servers, workstations, and so forth.

Still referring to FIG. 3, processor module 200 further includes an interface 240. Interface 240 may be used to couple processor module 200 to other system components, such as system agents, memory, other processors and the like via an interconnect 250. In various embodiments, interconnect 250 may be a point-to-point interconnect to couple processor module 200 to off-die components. Interface 240 may include various layers such as the physical, link and protocol layers discussed above with regard to FIG. 1. Accordingly, interface 240 may generate various control signals when an incoming packet is received via interconnect 250 while one or both of associated cores 220 and 225 is in a low power state. These signals may be used both to wake up the sleeping core, as well as to initiate a message back across interconnect 250 to an initiating device to request re-transmission of the packet. At the time of re-transmission, the associated core 220 and/or 225 may be fully active to handle processing of the packet, as described above.

Figure 4:
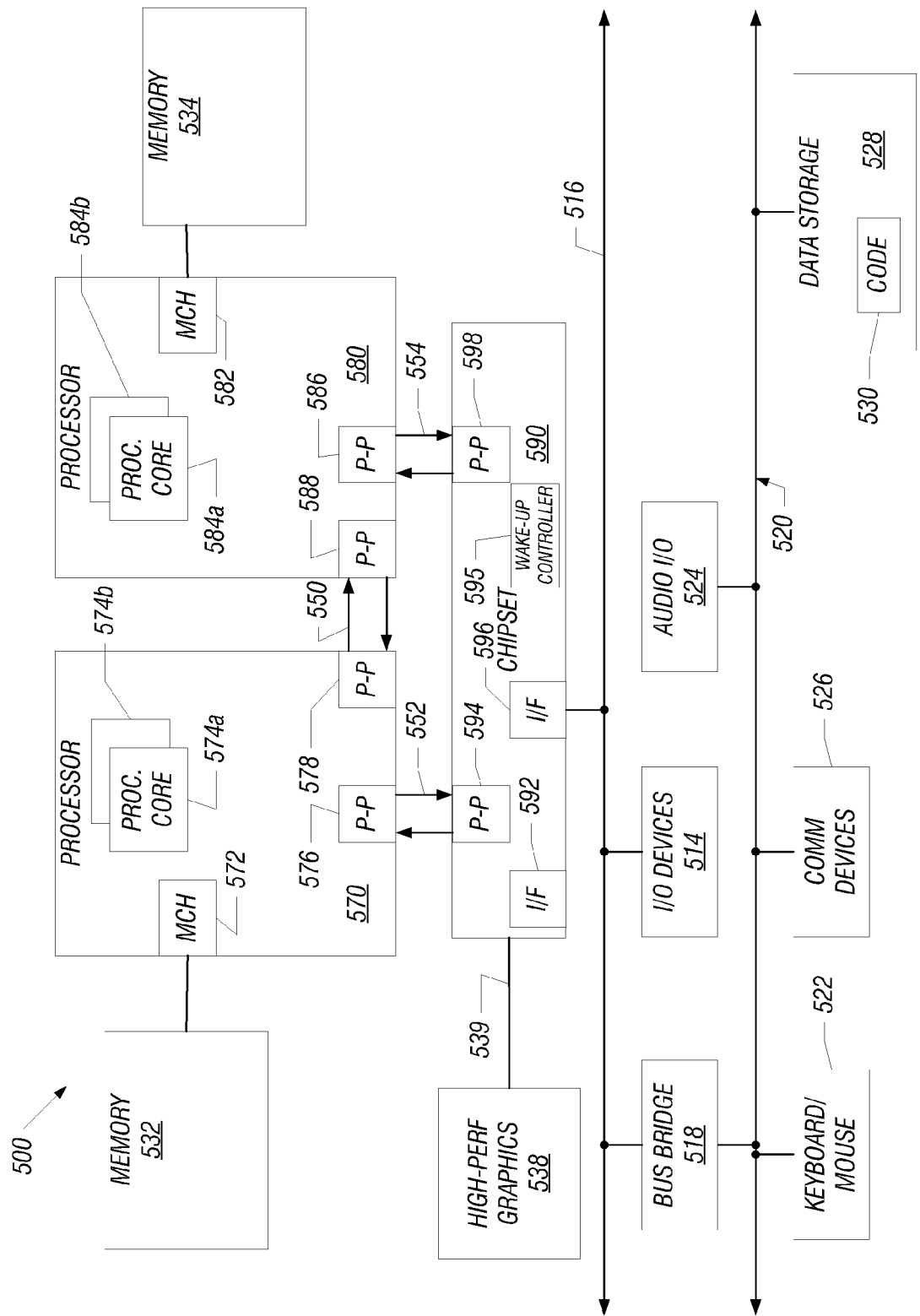
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, dual processor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b). In some implementations, system 500 may be a server present in a data center with many other similarly configured servers. Such implementations may take full advantage of the rapid exit latencies provided by embodiments to enable processors and other system agents in such servers to enter low power sleep states. For example, in a web server environment, data center or the like, many servers may be present to handle peak traffic times. However, when non-peak traffic is occurring, one or many of the servers may have significant power savings realized via components of the system coupled by interfaces or ports implementing embodiments of the present invention entering low power states. In this way, when traffic increases and more center resources are needed to handle the traffic, servers may quickly have their cores and other components exit low power states when incoming traffic is received. Furthermore, by the replay mechanisms described herein, no loss of data occurs, and no specialized software handling is required to "recover" from sleep state transitions.

First processor 570 further includes point-to-point (P-P) interfaces 576 and 578. Similarly, second processor 580 includes P-P interfaces 586 and 588. As shown in FIG. 4, MCH's 572 and 582 couple the processors to respective memories, namely a memory 532 and a memory 534, which may be portions of main memory locally attached to the respective processors. In various embodiments, the interfaces of first processor 570 and second processor 580 may include low power detectors as described above to enable both waking up of an associated core and triggering of a retry request to an initiating device when a packet is received while the core is in a low power state.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 such as a PCIe™ interconnect may couple these components. Chipset 590 may further include a wake-up controller 595 to wake up a selected core of first processor 570 or second processor 580 that may be in a low power state, if a packet received in chipset 590 is destined for the given core.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as a PCIe™ bus or another third generation I/O interconnect bus, although the scope of the present invention is not so limited.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 4, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments may also provide for improved acoustic behavior in a platform. For example, in the otherwise fully-active S0 power state, idle power may be reduced sufficiently that fans or other thermal management mechanisms may be completely turned off, despite full thermal design power (TDP) implementations which dictate full-speed fans. Furthermore, error handling mechanisms endemic to interfaces present in a platform may be used to enable power management of attached devices. In this way, verification of these error handling mechanisms and their associated hardware may be realized.

Embodiments may thus enable entry into a low power state such as a core clock-stopped deep sleep state, despite the presence of high-speed serial interfaces with power management policies that are not under direct control of a given interface controller such as an MCH or IOH. Embodiments thus make it possible to stop the core in low power states such as the S1 state, or even in the S0 state, in which some or all devices in the platform (e.g., graphics controllers, network adapters, or storage devices) are fully active; even when no software intervention in support of power management is occurring on any level in the system.

In various embodiments a reduction in overall dissipation under idle conditions may be realized. Using embodiments of the present invention, an additional design point on a dissipation versus exit latency curve may be provided between the fully active point (i.e., the S0 state), and the lowest exit latency state under direct software control (i.e., the S1 state). Embodiments may be particularly applicable to servers and workstations, as typically such systems have a large S1 exit latency that commonly precipitates falling back on the S3 state to provide greater power savings at only an incremental exit latency penalty.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an incoming packet in a first port from an interconnect while a core associated with the first port is in a low power state;
   sending a signal from the first port to the core to cause the core to enter a full power state; and
   generating a checksum error with respect to the incoming packet, regardless of whether the incoming packet includes an error, using the signal and transmitting a second signal from the first port along the interconnect to request re-transmission of the incoming packet, responsive to the checksum error.

2. The method of claim 1, further comprising placing the core into the low power state while a plurality of components of a system including the core are in a fully active state.

3. The method of claim 2, further comprising adjusting a speed of at least one fan in the system when the core is in the low power state.

4. The method of claim 2, further comprising placing the core into the low power state by turning off one or more clock networks of the core.

5. The method of claim 1, wherein the second signal comprises a no acknowledgement message.

6. The method of claim 1, wherein the second signal occurs during retraining of the interconnect to cause an initiator to re-transmit the incoming packet.

7. The method of claim 1, further comprising receiving in the first port a replayed incoming packet corresponding to the incoming packet from the interconnect and passing the replayed incoming packet to the core, wherein the core is in the full power state responsive to the signal.

8. The method of claim 7, further comprising preventing the core from re-entering the low power state until after the replayed incoming packet has been processed.

9. The method of claim 1, further comprising sending the signal to a checksum detector of the first port to force the checksum detector to generate the checksum error without regard to whether the incoming packet includes one or more bit errors.

10. An apparatus comprising:
    a receiver to receive an incoming packet;
    a packet detector to detect receipt of the incoming packet; and
    a wake circuit to cause a core to enter an active power state and to cause a transmitter to transmit a request for re-transmission of the incoming packet if the core is in a powered-down state when the packet detector detects receipt of the incoming packet, the wake circuit comprising logic circuitry to receive a power status signal from the core and a detection signal from the packet detector and to output a control signal to an error detector to initiate the request responsive to the control signal without regard to whether the incoming packet includes one or more bit errors, and to the core to initiate a transition to the active power state.

11. The apparatus of claim 10, wherein the apparatus comprises a port of an interface coupled to the core.

12. The apparatus of claim 11, wherein the port includes a link layer to implement the wake circuit, the link layer further including the error detector to detect the one or more bit errors associated with the incoming packet, wherein the link layer is to force the error detector to indicate a packet failure for the incoming packet regardless of the content of the incoming packet if the core is in the powered-down state.

13. The apparatus of claim 10, wherein the core has a core clock to be disabled while the core is in the powered-down state.

14. The apparatus of claim 13, wherein the core clock is to be disabled while at least one other component of a system including the core is in a full power state.

15. The apparatus of claim 14, wherein the core clock is to transition into the powered-down state autonomously without intervention by power management software.

16. A system comprising:
    a first processor including a plurality of cores including a first core and a second core, and an interface coupled to the plurality of cores, the interface having a port to couple to an agent via a serial interconnect, the port to masquerade a signaling error with respect to an incoming packet received when the first core is in a low power state regardless of whether the incoming packet includes one or more bit errors, and including a controller to cause the first core to enter an active power state responsive to receipt of the incoming packet; and
    a dynamic random access memory (DRAM) coupled to the first core.

17. The system of claim 16, wherein the port is to transmit a retry request to the agent to masquerade the signaling error.

18. The system of claim 17, wherein the controller is to receive a power status signal from the first core and a detection signal for the incoming packet and to output a first signal to an error detector to initiate the retry request and to the first core to initiate a transition to the active power state.

19. The system of claim 18, further comprising a packet detector to detect receipt of the incoming packet from the agent via the detection signal.

20. The system of claim 16, wherein the system comprises a server of a data center, wherein the first core to be in the low power state based on incoming traffic to the data center, wherein the first core is to send a status signal to the port to indicate the low power state.

* * * * *